April 20, 1937.  S. G. FRANTZ  2,077,555
SPEED CONTROL DEVICE
Filed Jan. 28, 1932  2 Sheets—Sheet 1

INVENTOR
SAMUEL G. FRANTZ

BY Frank S. Misterly
ATTORNEY

Patented Apr. 20, 1937

2,077,555

UNITED STATES PATENT OFFICE 2,077,555

SPEED CONTROL DEVICE

Samuel G. Frantz, Princeton, N. J.

Application January 28, 1932, Serial No. 589,440

18 Claims. (Cl. 137—144)

This invention broadly relates to motor vehicles and more particularly to speed controlling apparatus therefor.

It is a well known fact that speed laws, in most instances, are broken unintentionally and that accidents usually occur because the driver of the vehicle does not realize that the vehicle is travelling at an excessive rate. For instance, supposing that the speed laws of a certain community are 30 miles per hour and that portions of the road in said community are very rough and other portions comparatively smooth, a driver travelling at 30 miles per hour or thereabouts on the rough portions will find that he normally travels 40 or 50 miles per hour on the smooth portions without realizing it. The same tendency to speed occurs when the vehicle has been climbing a grade and suddenly comes to a downhill or level portion of the roadway.

It is also a fact that improvements now incorporated in automobiles such as vibrationless engines, "free-wheeling", adjustable shock absorbing means and similar devices calculated to increase the pleasure of motoring are conducive to unintentional speeding and resultant accidents.

While ordinary governor systems prevent speeding, such systems are not desirable because of the fact that the governor prevents the vehicle attaining a speed greater than the predetermined comparatively low limit to which the governor would have to be set to be effective so as to conform to the various speed laws. This fact makes it extremely dangerous to pass slower going vehicles except under the most favorable road and traffic conditions, thereby substantially preventing the passing of vehicles such as trucks and the like and accordingly detracting from the pleasure of motoring. It is also a fact that a governor controlled vehicle would preclude the possibility of avoiding many accidents of the type that can be avoided by suddenly accelerating the car for a few moments to a high rate of speed.

In its broad aspect this invention is directed to means controlled by the speed of the vehicle for forcefully apprising the driver that the speed of the vehicle has departed from a predetermined value.

The invention provides means for physically opposing to a certain predetermined degree any effort on the driver's part to increase the speed of the vehicle beyond a predetermined level or to maintain the speed of the vehicle beyond that predetermined speed level. However, the opposition to the driver's efforts, as above discussed, is of such a nature that it may be easily overcome by the driver should the desire or necessity to do so arise.

A feature of the present invention is that the desirable objects thereof are accomplished without changing or in any way altering the normal operation of a motor vehicle.

From what precedes it will be seen at once that the present invention incorporates substantially all the advantages of a governor controlled vehicle without any of its disadvantages.

The invention will be more clearly understood from the following detailed specification when read in connection with the drawings, in which, Fig. 1 is a schematic illustration of one form of the invention as applied to the accelerator pedal of a motor vehicle;

Figure 1:
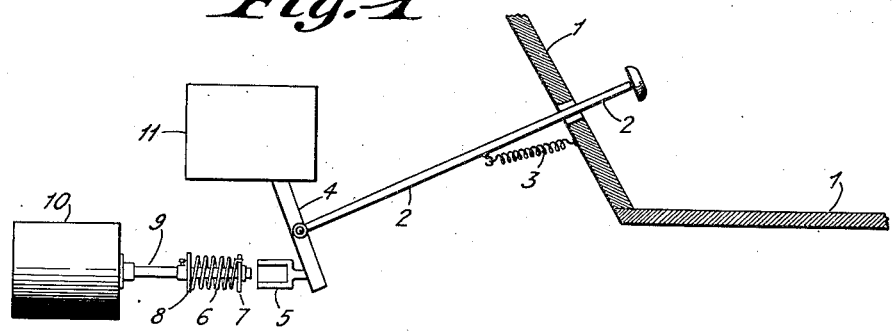

In Fig. 1, those portions of a motor vehicle essential to a description of the present invention are shown and comprise vehicle floor boards 1, accelerator pedal stem 2, a throttle valve 11, and the valve operating lever 4 suitably attached to the accelerator stem 2 as shown. A spring 3 attached at one end to the floor boards 1 and at the other end to the stem 2 serves to return the stem 2 to its normal position whenever the pressure thereon is relieved.

The invention as applied to Fig. 1 comprises a governor 10 including a displaceable shaft 9 having supported thereon a fixed plate 8 and a slidable plate 7 with a coil spring 6 interposed between the two plates. Lever 4 is provided with a member 5 adapted to cooperate with plate 7. Governor 10 is suitably controlled by the speed of the vehicle and is so adjusted that the shaft 9 will be displaced to the right (Fig. 1) whenever the speed of the vehicle reaches or exceeds a predetermined value. Under these conditions plate 7 will abut against member 5 with the result that spring 6 will be compressed. The degree of compression of spring 6 is dependent upon the distance the accelerator button is depressed. It follows from the above that after the speed of the vehicle has attained a predetermined value, the driver would not only have to exert enough pressure on the accelerator button to overcome the normal pull of spring 3 but he would also have to overcome the expansive extra force of spring 6. The extra force required should be great enough to be noticeable but not difficult to overcome should the occasion or desire to do so arise.

Figure 2:
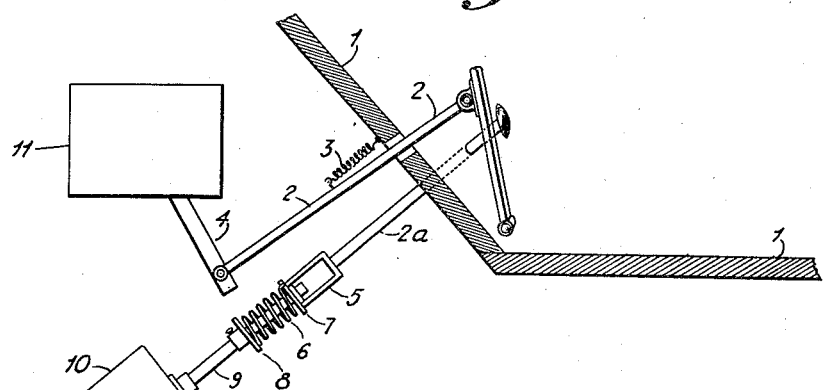
Fig. 2 illustrates a modification of the invention shown in Fig. 1.

In Fig. 2 the governor acts upon an auxiliary shaft 2a which is placed alongside the accelerator 2. The button of shaft 2a is positioned with respect to the accelerator so that the driver's foot may rest on both the accelerator and the button or if desired on the accelerator alone. The operation of the system of Figure 2 is the same in principle as the system of Fig. 1 except that the governor acts upon the operator's foot directly. It can be seen that a system constructed as shown in Fig. 2 offers the advantage that by moving the foot away from the governor controlled button the driver may avoid interference by the governor or by leaving the foot on the button he may overcome the added force of spring 6 should the necessity to speed arise.

Figure 3:
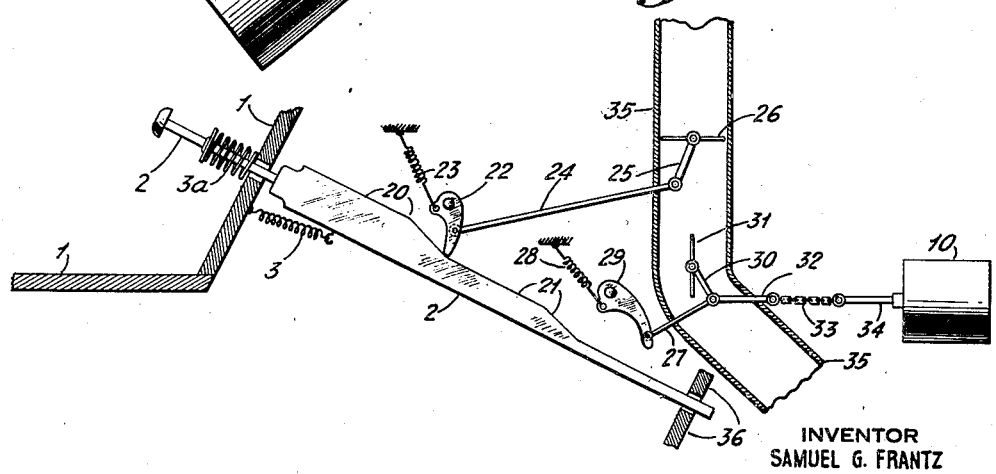
Fig. 3 illustrates in schematic form another embodiment of the invention.

In Fig. 3 the accelerator shaft comprises a cam lever 2. The cam lever is guided by means of guides 36 and is provided with two cam surfaces 20 and 21 adapted to cooperate with cam followers 22 and 29 respectively. Fuel intake conduit 35 is provided through which the mixture from the carburetor is drawn to the engine. The conduit 35 is provided with two butterfly valves 26 and 31 the former being operated entirely by the cam follower 22 through the linkage 24 and 25 while valve 31 is adapted to be operated by a governor 10 and under certain circumstances by cam follower 29. Governor 10 is controlled by the speed of the vehicle and comprises a displaceable member 34 which is attached by flexible means 33 and linkage 32, 30 to valve 31. Link 30 is connected to cam follower 29 by means of link 27. A spring 3 serves to return stem 2 to its normal position whenever the pressure on the accelerator button is released. Spring members 23 and 28 are for the purpose of forcing cam followers 22 and 29 respectively into engagement with their respective cam surfaces.

A spring 3a is provided for offering resistance in addition to the resistance of spring 3 to movements of the accelerator stem 2 beyond a certain point. The valve 31 is normally held open by the governor as shown in Fig. 3 despite the force of spring 28 exerted upon cam follower 29. Valve 26 is normally closed and is adapted to be opened by pressing the accelerator button. As is clear from the drawings when the accelerator button is pressed downwardly the cam surface 20 acts to rotate cam follower 22 counterclockwise with the result that valve 26 is opened. The degree of opening depends upon the distance that the accelerator is moved downwardly.

The arrangement is preferably such that valve 26 is full open when the accelerator button has been moved about half way down at which time the straight portion of cam edge 20 maintains valve 26 full open despite further downward movement of the accelerator. To move the accelerator beyond the half-way point, in a downward direction the extra compression force of spring 3a must be overcome.

Governor 10 is so adjusted that when the vehicle attains a speed greater than a predetermined speed, member 34 is displaced to the left with the result that cam follower 29 is rotated clockwise through the action of spring 28. This rotation of follower 29 closes valve 31, the degree of closure depending upon the speed of the vehicle. Cam follower 29 is so arranged with respect to the cam surface 21 that with valve 31 closed follower 29 would not come into contact with the lowest portion of the inclined portion of cam surface 21 and thereby be operated thereby with further movement of the accelerator until the accelerator button is depressed to the point where the additional force of spring 3a would have to be overcome for further downward movement. It can be seen that when this point is reached and assuming that the vehicle is overspeeding to some extent with the result that valve 31 is partially or wholly closed, any further downward movement of the accelerator will open valve 31 and the vehicle speed will increase accordingly. It is to be understood that if the car is not overspeeding the governor would maintain the valve 31 open, hence, the cam surface 21 would not affect the follower 29. Connecting means 31 between the displaceable element 34 and link 32 is made flexible in order to allow the governor free movement when the vehicle overspeeds even though valve 31 is being held open by cam surface 21.

In operation of the system shown in Fig. 3, the driver would normally maintain the accelerator at the point where further downward movement would involve compressing spring 3a. The governor controlled valve would then tend to maintain the vehicle at the proper speed. However, should the driver desire to exceed the set speed a further downward movement of the accelerator against the force of spring 3a would overrule the governor.

Figure 4:
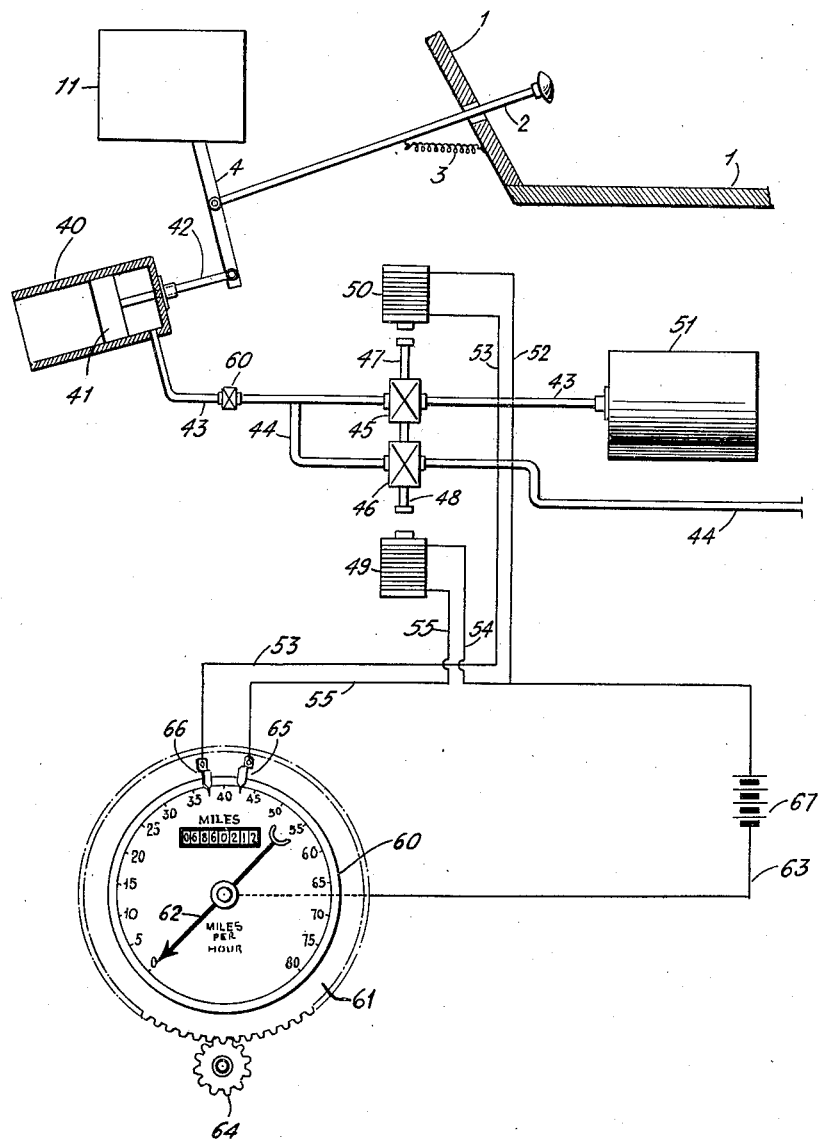
Fig. 4 is a schematic representation of another embodiment of the invention with an electrical control system.

In Fig. 4 a controlling system is shown wherein the speedometer of the vehicle with a few minor additions replaces the governor. In Figure 4, the throttle valve 11 of the vehicle is controlled in the usual manner by accelerator 2 which is depressed against the force of spring 3 to open the valve 11 through lever 4. Upon releasing the pressure on the accelerator, spring 3 will return the throttle lever 4 to its normal position. In accordance with the invention, a cylinder 40 is provided having a cooperating piston 41 and piston rod 42. Rod 42 is attached to throttle lever 4 in any suitable manner so that any motion of lever 4 necessarily involves a corresponding movement of piston 41 within the cylinder 40. The cylinder 40 is provided with a conduit 43 which provides a passageway between cylinder 40 and a vacuum tank 51. An electric valve 45 is adapted to open and close the passageway 43. A second conduit 44 is adapted to provide a passageway from the cylinder to the atmosphere. This passageway is controlled by a second electric valve 46. The two electric valves 45 and 46 are interconnected in such a way that when one is open the other is closed. For this purpose the valve operating mechanisms 47, 48 of the two valves are interconnected and controlled by two electromagnets 50 and 49. The arrangement is such that when magnet 49 is energized valve 45 is opened and valve 46 closed whereas when electromagnet 50 is energized valve 46 is opened and valve 45 closed.

With valve 46 open and valve 45 closed the cylinder is open to the atmosphere through conduit 44 so that the operation of the accelerator pedal 2 is not interfered with in any way and normal operation thereof is attained. With valve 45 open and valve 46 closed the suction caused by the vacuum from 51 would tend to move the piston so as to close the throttle valve and at the same time exert a force tending to force the foot of the operator resting on the accelerator upwardly.

It is to be understood that the necessary vacuum may be produced by the suction action of the engine.

The usual speedometer comprising dial 60 and pointer 62 is provided with a friction or gear wheel 61 rotatably mounted in back of the dial in any suitable manner. Wheel 61 is adapted to be rotated by means of cooperating friction or gear wheel 64 from a suitable knob not shown on the instrument board. Gear wheel 61 is preferably made of non-conductive material such as bakelite, and is provided with a pair of conducting contact elements 65, 66 supported thereby and adapted to hang over the speedometer dial 60. The two contact elements are preferably spaced apart a distance corresponding to 3 or 4 miles per hour on the dial 60. The pointer is constructed of conducting material and is connected by lead 63 to one terminal of a suitable source of current 67. The overhanging portions of contact elements 65 and 66 are of such a length that the pointer 62 is adapted to make contact therewith when the pointer 62 passes the elements. Element 66 is connected by suitable conducting wire 53 to one terminal of electro-magnet 50 while element 65 is connected to one terminal of magnet 49 by conductor 55. The other terminal of magnet 50 is connected to the free side of source 67 by means of conductor 52 while the other terminal of magnet 49 is connected to conductor 52 by means of conductor 54.

The system disclosed in Fig. 4 operates as follows:—

The operator by turning wheel 64 rotates wheel 61 until element 65 is at a point with relation to dial 60 corresponding to a speed slightly over the speed he does not want to exceed. Element 66 being supported by wheel 61 will indicate a speed a few miles less than the speed indicated by element 65. Assuming that the set speed is not exceeded, the operator's actions are not interfered with in any way since the cylinder 40 is open to the atmosphere and the piston 41 is free to move either up or down depending upon the movements of the accelerator. Should the vehicle exceed the set speed, indicator 62 would contact with element 65. This would energize magnet 49 thereby opening valve 45 and closing valve 46.

The suction action of the engine would then tend to move the piston upwardly and to the right (Fig. 4) with the result that the operator would be forcefully notified that the set speed was being exceeded. The operator can overcome the force exerted by the piston 41 by applying an added force with his foot and thereby increase the speed of the car or maintain it above the set speed level.

Suppose, however, that the operator does not desire to overspeed then he would slowly ease the pressure applied to the accelerator by allowing the force of piston 41 to move the accelerator upwardly and thereby slow the vehicle down. When the speed of the vehicle is decreased to such an extent that the pointer 62 comes in contact with element 66 electro-magnet 50 is energized with the result that valve 45 is closed and valve 46 opened thereby normalizing the operation of the vehicle. The suction action on the cylinder-piston arrangement 40, 41 should be limited so that it can be easily overruled by the driver should the desirability thereof arise. The limiting action can be accomplished by placing a suitable automatic valve 60 in the pipe line 43 or any other suitable place. The automatic valve is preferably set so that it opens whenever the suction action becomes greater than a predetermined amount. Another way which may alternatively be employed for limiting the force exerted by piston rod 42 upon throttle arm 4 is to insert between rod 42 and arm 4 a spring mechanism similar to that shown in Fig. 1 between rod 9 and arm 4.

In case the governing action is not desired any suitable clutch means may be provided between the governor and governor driving means or the speed setting means may be set to an abnormally high speed such as 80 miles per hour in which case there would be very little likelihood that the governing action would come into action, unless, of course, that high speed was reached.

I claim:

1. In a motor vehicle in which a throttle control device projects from the floor of the vehicle and which is adapted to be operated by the operator's foot by depressing the device in accordance with the speed desired, an indicator device also projecting from the floor of the vehicle adjacent the throttle and so arranged that the driver's foot may be placed so as to be in operative relationship with both said throttle and said indicator device, a speed responsive device, and means controlled thereby and acting on said indicator device for forcefully apprising the driver whenever the speed of the vehicle departs from a predetermined value.

2. In a motor vehicle, in which a foot operated throttle control device, projects from the floor of the vehicle, said throttle control device being adapted to be moved downwardly in accordance with the speed desired, an indicator device also projecting from the floor of the vehicle adjacent said throttle control device and so arranged that it may be operated simultaneously with the operation of the throttle device, a speed responsive device coacting with said indicator device and adapted to apply a force thereto tending to move the indicator upwardly whenever the speed of the vehicle exceeds a predetermined value thereby giving the operator a forceful indication that the speed of the vehicle has exceeded the predetermined value.

3. In a motor vehicle, a foot operated speed control throttle, a foot rest projecting through the floor board of the vehicle, and positioned so as to be alongside the throttle lever, a speed responsive means, and means controlled by the speed responsive means for adjusting the height of the foot rest relative to the floor board in accordance with the vehicle speed.

4. In a motor vehicle, a foot operated speed control throttle, a movable foot rest projecting a predetermined normal amount upwardly through the floor of the vehicle, and positioned alongside the throttle lever, a speed responsive means, and means controlled by the speed responsive means for displacing the foot rest from its normal position when the speed of the vehicle exceeds a predetermined value.

5. A system as described in the next preceding claim wherein the speed control means displaces the movable foot rest upwardly from its normal position whenever the speed of the vehicle exceeds a predetermined value and returns said foot rest to its normal position when the vehicle speed falls below said predetermined value.

6. In a motor vehicle or the like in which there is provided a fuel feeding means and a throttle speed control device and wherein a positive control is provided between the speed control device and the fuel feeding means, said speed control device being arranged so as to project from the floor of the vehicle and positioned with respect thereto so as to be capable of being operated by the vehicle operator's foot by depressing the device in accordance with the speed desired, a speed responsive device, a movable indicator means operatively connected to the speed responsive device and arranged with respect to the throttle device so as to provide an indicator for the operator of the vehicle to thereby facilitate maintaining the vehicle speed below a predetermined value, said indicating means being controlled by the speed responsive device for imparting a forceful indication upon the operator's foot whenever the speed of the vehicle exceeds the predetermined value, said speed control device being always positively connected to the fuel feeding means so that the fuel feeding means may be operated thereby from a substantially closed position to a substantially full open position at any time to thereby provide full control of the vehicle speed irrespective of the operation of the speed responsive device.

7. A system as described in the next preceding claim, further characterized by that the indicator means also acts to increase the force necessary to depress the throttle device when the speed of the vehicle is in excess of the predetermined value.

8. In a motor vehicle in which a throttle speed control device projects from the floor of the vehicle, said speed control device being adapted to be operated by the operator's foot by depressing the device in accordance with the speed desired, a fuel feeding means, means for operatively connecting the fuel feeding means and the speed control device, a speed responsive device, a movable indicator means operatively connected to the speed responsive device and arranged with respect to the throttle device so as to provide an indicator for the operator of the vehicle to facilitate maintaining the vehicle speed below a predetermined value, said indicating means being controlled by the speed responsive device for imparting a forceful indication upon the operator's foot whenever the speed of the vehicle departs from the predetermined value, said speed control device being always positively connected to the fuel feeding means whereby operation of the speed control device affects the fuel feeding means at all times irrespective of the operation of the speed responsive means.

9. In a motor vehicle, a throttle, operation of which against a normal resistance increases the speed of the vehicle and means for increasing the resistance to an abnormal value whenever the speed of the vehicle exceeds a predetermined value said means being otherwise ineffective to influence the operation of the vehicle.

10. In a motor vehicle which includes an engine, a throttle for controlling the speed of the vehicle, a speed responsive device, means actuated by the engine and controlled by said speed responsive device for affecting the movement of said throttle when the speed of the vehicle departs from a predetermined value.

11. In a motor vehicle which includes an engine the operation of which causes a suction action, a throttle, the movement of which in accordance with a force applied thereto causes a change in the vehicle speed, a speed responsive device, means responsive to said suction action and controlled by said speed responsive device for normally limiting the speed of propulsion of the vehicle so as not to exceed a predetermined value and means responsive to an increased force applied to said throttle for rendering the speed limiting controlling action ineffective during the time period of application of the increased force.

12. In a motor vehicle, a movable speed controlling device adapted to be operated by the driver, a speed responsive means, and means controlled by said speed responsive means for interposing a device in the path of movement of said speed controlling device for opposing movement of the speed controlling device in one direction whenever the speed of the vehicle exceeds a predetermined value said speed responsive device being otherwise ineffective to influence the operation of the vehicle.

13. In a motor vehicle, a movable speed control device movements of which are adapted to be controlled by the application of a force thereto, a speed responsive means, and means controlled by the speed responsive means for opposing movement of the speed control device by neutralizing to any desired extent the force applied thereto when the speed of the vehicle exceeds a predetermined value, said speed responsive device being otherwise inoperative to affect the vehicle speed control device.

14. In a motor vehicle, an operable throttle device for controlling the speed of the vehicle, said throttle device having means to provide a normal resistive force upon operation thereof in a sense to increase the speed of the vehicle, a speed responsive device and means controlled by the speed responsive device to add to the normal resistive force an additional resistive force when the speed of the vehicle exceeds a predetermined value, said speed responsive device being otherwise ineffective to influence the operation of the vehicle.

15. In a motor vehicle having a throttle valve, a speed controlling device connected to the valve and adapted to be operated by the operator, a speed responsive device normally ineffective to influence the throttle valve and means controlled by the speed responsive device for neutralizing to any desired extent any force applied by the operator upon the speed controlling device tending to affect the throttle valve so as to maintain the speed of the vehicle above a predetermined value, said neutralizing means being effective only after the speed of the vehicle exceeds said predetermined value and ineffective when the speed of the vehicle is below said value, said throttle valve and speed controlling device being always connected so as to provide control of the vehicle by the speed controlling device irrespective of the operation of the speed responsive device.

16. In a motor driven vehicle, an engine, an operable throttle device for controlling the engine speed and thereby determine the vehicle speed, a speed responsive device, a movable indicator device operatively connected to the speed responsive device and means actuated by the engine and controlled by the speed responsive device for affecting the operation of the throttle device whenever the speed of the vehicle departs from a predetermined value.

17. In a vehicle having a prime mover, a throttle, means for controlling the throttle within substantially its full range of operation, said means including a lever device adapted to be displaced from a released position against a predetermined returning force by the application of pressure thereto to determine the speed of the vehicle, a vehicle speed responsive device and means controlled by said speed responsive device for perceptibly increasing the returning force whenever the speed of the vehicle is in excess of a predetermined value, said last named means being ineffective to alter in any way the ability of the lever device to control the throttle throughout said substantially full range of operation.

18. In a vehicle having a prime mover, throttle controlling means therefor including a lever device adapted to be displaced, by the application of pressure thereto, from a released position against a predetermined normal returning force to increase the speed of the vehicle, a fluid motor device connected with the prime mover and adapted to be operated thereby, means including a vehicle speed responsive device to control the operation of said fluid motor device, said fluid motor device being adapted to increase substantially the returning force applied to said lever device when the speed of the vehicle exceeds a predetermined value whereby the force required to be applied to said lever device to maintain the vehicle at speeds exceeding said predetermined value is substantially in excess of the force required in operating the vehicle at speeds below the predetermined value.

SAMUEL G. FRANTZ.